E. GUTHRIE.
CONTROLLER CRANK FENDER OPERATOR.
APPLICATION FILED JULY 3, 1912.
1,075,647.
Patented Oct. 14, 1913.
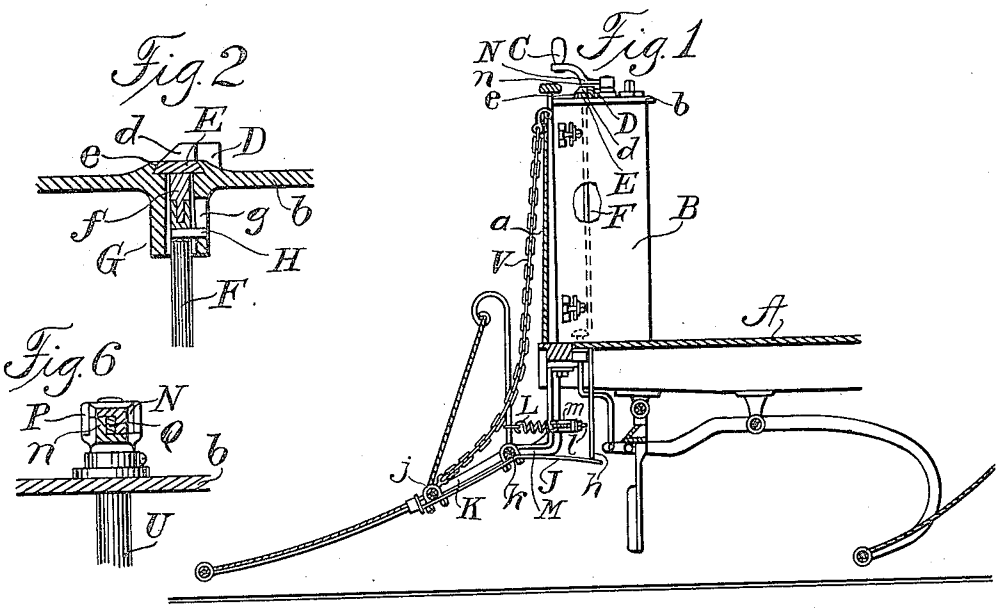
Fig. 2, Fig. 6, Fig. 1
Fig. 3
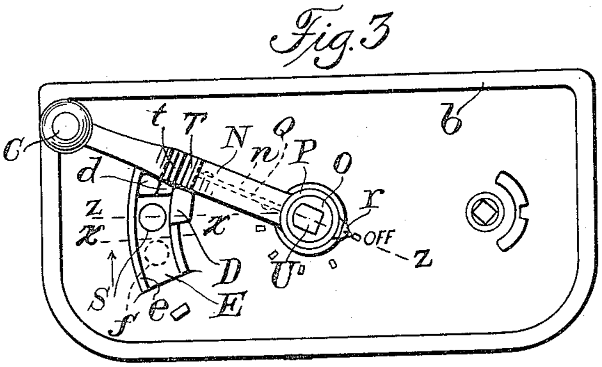
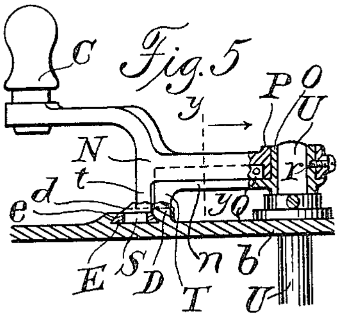
Fig. 5
Fig. 4
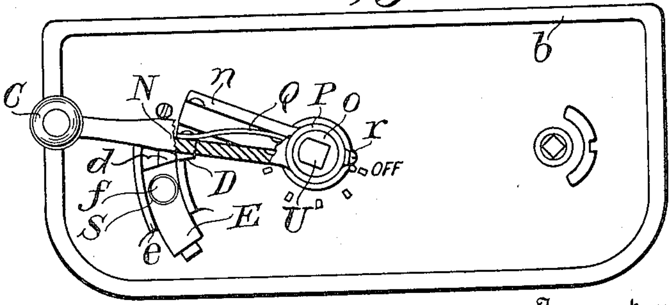
Fig. 7
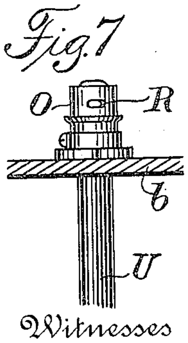
Witnesses
M. E. Myers
G. Terry
Inventor
Edwin Guthrie.
COLUMBIA PLANOGRAPH CO., WASHINGTON, D. C.

UNITED STATES PATENT OFFICE.

EDWIN GUTHRIE, OF WASHINGTON, DISTRICT OF COLUMBIA.

CONTROLLER-CRANK FENDER-OPERATOR.

1,075,645. Specification of Letters Patent. Patented Oct. 14, 1913.

Application filed July 3, 1912. Serial No. 707,541.

*To all whom it may concern:*

Be it known that I, EDWIN GUTHRIE, a citizen of the United States, residing at Washington, in the District of Columbia, have invented certain new and useful Improvements in Controller-Crank Fender-Operators, of which the following is a specification.

This invention relates to controller crank fender operators, and has for its object the production of a controller crank and devices combined therewith of such construction and operation that the motorman of an electrically propelled car by turning the controller any distance off the current, and without releasing his grasp of the crank and by a movement in the same direction, drops the fender in front of the car.

The preferred construction and arrangement of the parts of this invention are illustrated in the accompanying drawings, of which—

Figure 1 is a longitudinal sectional view of the front portion of a car provided with a fender and equipped with this invention for dropping the fender. Fig. 2 is a sectional view, somewhat enlarged, of a portion of the top of the controller casing, showing the movable rod for the fender support releasing devices and the slidable plate in contact with the rod. Fig. 3 is a top plan view of a controller casing showing a position of the handle crank, and Fig. 4 is a top plan view of a controller casing showing the position of the movable portion of the handle crank when releasing the rod and dropping the fender. Fig. 5 is a side elevation of the handle crank and a section of part of the top of the controller casing. Fig. 6 is a cross-section of the body of the handle crank showing the form of the two portions thereof in the cross-section. Fig. 7 is an enlarged view of that portion of the handle crank engaging the vertical shaft and shows the transverse groove therein. All the views after Fig. 1 are upon an enlarged scale of drawing. The section shown in Fig. 2 is taken on the broken line *x—x* of Fig. 3. The section shown in Fig. 6 is taken upon the broken line *y—y* of Fig. 5, and the sectional parts shown in Fig. 5 are assumed to be cut upon the indented broken line *z—z* of Fig. 3.

Throughout the description and drawings the same letter is used to refer to the same part.

The car A and the dashboard *a*, and while is erected the controller casing B having the top *b*. Upon the top *b* is arranged the handle crank C in engagement with the vertical shaft U of the controller. Upon the top *b* are two lugs or stops D and *d*, the former being a part of the top and relatively fixed, and the other lug *d* being a part of a slidable plate E movable in guides *e*. As best shown in Fig. 2, a vertical rod F, usually provided with a removable wearing cap *f*, abuts against the lower surface of the slidable plate E. The rod is guided vertically in the sleeve G of the top *b*, and the engagement of the stop *g* and the pin H limits the upward movement of the rod.

Considering Fig. 1, it will be observed that the lower end *h* of the rod F bears upon a spring plate J secured by the clamps *j* to a fender K pivotally supported upon the transverse tube *k*. As shown in Fig. 1, the tube *k* is supported by the brackets M.

It will be noted that the slidable plate E with the rod F in contact with it and with the spring plate J constitute a set of devices by which the fender K is suspended in its usual position while the car is running.

Considering Figs. 4, 5, and 6 it will be observed that the handle crank C of the controller comprises two portions, one portion movable with respect to the other portion. The upper portion N which is termed in this application the movable arm portion of the crank bears the handle of the crank, and the lower portion *n* immovably engages the vertical shaft U by means of the sleeve O. It will be understood that while the crank as a whole may be lifted off the squared end of the shaft U in the ordinary manner, the portion *n* is immovable horizontally with respect to the shaft. In other words when the portion *n* of the crank is moved horizontally, the shaft must turn with it. As best shown in Fig. 5, the crank portion N has a hub P fitting the sleeve O securely and movable thereon. It will be noted in Fig. 6 that the two portions N and *n* of the crank are angular in cross-section, and between them, and suitably connected with both is arranged a strut spring Q. The spring Q is also shown in Fig. 4. To a certain extent the spring holds the two portions of the crank together against displacement vertically one with respect to the other, and the separation thus is additionally guarded against by the engagement of the transverse slot R in the sleeve O, shown in Fig. 7, with the set screw *r*, shown in Figs. 3, 4 and 5.

The remaining parts of this invention are best described in connection with the explanation of the mode of operation.

So long as the slidable plate E remains in the position shown in Fig. 3, the rod F cannot move upwardly, and the fender is supported with its front portion raised above the roadbed. During the progress of the car the fender unavoidably swings up and down at times, and the vertical rod F, and consequently the slidable plate E may be subjected to blows or jolts, the violence of which may be materially decreased by the use of a balancing spring L, adjustable by the screw rod *l*. The spring has one end attached to the fender, and the screw rod *l* engages an arm *m* carried by the fender bracket M. In Fig. 3 the controller crank is in the position assumed after the current has been cut off. Let it be now supposed that the crank is swung around, with the hands of a watch. During such movement, the parts N, *n*, and the spring Q, comprising the body of the crank, are all in contact as illustrated in Fig. 6. During the reverse movement, the stiffness of the spring Q must be relied upon to turn the portion *n* of the crank, and the vertical controller shaft U. The spring Q is, therefore, made sufficiently stiff for that purpose. The motorman applies just enough strength to turn the crank with desired rapidity, bringing the lug T of the portion *n* against the stop D of the top *b*, and, at the same time bringing the lug *t* of portion N of the crank contiguous to the stop *d* on the slidable plate E. In Fig. 5 it is shown that the upper portions of the stops D and *d* are broken away in order that the contact of the lug T with the fixed stop D, and the contact of the lug *t* with the stop *d* on the slidable plate E may be seen. As already explained those contacts take place at the termination of the movement of hand crank C contrary to the hands of a watch, usually the movement which shuts off the current. Now, the portion *n* of the crank is stopped by the contact of lug T with fixed stop D, and, the portion N will be also stopped unless sufficient force be exerted to slide plate E, which is a movable member of the fender-supporting devices. In an emergency, the motorman exerts more force, separating the portions of the crank in the same direction in which the crank was moved to cut off the current, and the slidable plate is moved until the opening S admits the end of the rod F, and the fender is dropped. Practically, the same operation which shuts off the current drops the fender. No separate fender-dropping devices are to be actuated at what may be a critical moment.

It has been stated herein that the stiffness of spring Q is relied upon to carry out the cutting-off movement. The pull of that movement is on the spring Q, but the necessary force is not enough to bend the spring very much. After the portion *n* is stopped by stop D, and the motorman desires to drop the fender by the slidable plate E as explained, he must, of course, put forth strength sufficient to overcome the stiffness of spring Q. If he does not desire to drop the fender, but simply wishes to switch off the current in the usual manner, he does not apply any extra force after the stop D is encountered. In all controllers as ordinarily arranged the movement of the crank with the hands of a watch switches the current on, and the contrary movement switches the current off. It is a forcible continuation of the movement switching off the current, that releases the devices supporting the fender and permits it to drop as explained. Such forcible movement causes the lug *t* of the crank to strike the stop *d* on the plate E, moving the parts into the positions shown in Fig. 4 and permitting the head of the rod F to rise through the opening S of the plate E and releasing the fender. In the rare event of the breaking of the spring Q, the screw *r* in hub P will come into contact with the end of the slot R in the sleeve O, and the cutting-off movement of the crank may be made as usual.

Considering Fig. 1, the chain V will be noted, having one end hooked over the dashboard *a* and the other end connected with the fender. The fender having been dropped, it may be raised from the car by means of the chain, until the end of rod F descends far enough to permit the motorman to slide plate E into its original position over and against the end of the rod.

Having now described this invention, and explained the mode of its operation, what I claim and desire to secure by Letters Patent is:—

1. In a controller crank fender operator, the combination with a pivoted fender, of releasable supporting devices constructed to support the fender, a vertical shaft, and a hand crank having a main portion movable relatively to a portion immovably engaging said shaft, the said fender-supporting devices having a member arranged in the path of and constructed to be operated by the main portion of said crank whereby the fender is released and the front portion of the fender is permitted to swing downwardly.

2. In a controller crank fender operator, the combination with a pivoted fender, of releasable supporting devices constructed to support the fender, a vertical shaft, a hand crank having a main portion movable horizontally circularly relative to a portion immovably engaging said shaft, a fixed stop arranged to arrest the movement of the said portion of the crank engaging said shaft, and the said fender-supporting devices having a member arranged in the path of and constructed to be actuated by the said main portion of the crank whereby the fender is released and the front portion of the fender is permitted to swing downwardly.

3. In a controller crank fender operator, the combination with a pivoted fender, of releasable supporting devices constructed to support the fender, a vertical shaft, a hand crank having a main portion movable horizontally circularly relative to a portion immovably engaging the said shaft, a fixed stop arranged to arrest the movements of the said portion of the crank engaging the shaft, and connecting means arranged to connect the said portions of the crank whereby the said portions may be moved together, the said connecting means being constructed to allow the movement of said main portion with respect to the portion engaging the said crank, and the said fender-supporting devices having a member arranged in the path of the main portion of the crank and constructed to be actuated thereby to release the said devices and fender and the front portion of the fender is permitted to swing downwardly.

4. In a controller crank fender operator, the combination with a pivoted fender, of releasable supporting devices constructed to support the fender, a vertical shaft, a hand crank having a main portion movable horizontally circularly relative to a portion immovably engaging said shaft, a fixed stop arranged to arrest the movements of the said portion of the crank engaging the shaft, and a spring connected with the said portions of the crank whereby the said portions may be moved together, the said spring being constructed to yield to excess pressure allowing said portions of the crank to separate, and the said fender-supporting devices having a member arranged in the path of and constructed to be actuated by the main portion of the crank whereby the said supporting devices and fender are released and the front portion of the fender is permitted to swing downwardly.

5. In a controller crank fender operator, the combination with a pivoted fender, of releasable supporting devices constructed to support the fender, a vertical shaft, and a hand crank provided with a projecting lug and a portion engaging said shaft, the said fender-supporting devices having a movable member arranged in the path of said lug and constructed to be moved by the lug whereby the fender is released and the front portion of the fender is permitted to swing downwardly.

In testimony whereof I affix my signature in presence of two witnesses.

EDWIN GUTHRIE.

Witnesses:
Horace R. George,
G. Terry.

Copies of this patent may be obtained for five cents each, by addressing the "Commissioner of Patents, Washington, D. C."